United States Patent [19]
Touchton et al.

[11] Patent Number: 5,425,330
[45] Date of Patent: Jun. 20, 1995

[54] ANIMAL CONTROL DEVICE

[75] Inventors: Scott F. Touchton, Malvern; Michael S. Newell, Upper Darby, both of Pa.; Donald L. Peinetti, Lakeside, Calif.

[73] Assignee: Invisible Fence Company, Inc., Malvern, Pa.

[21] Appl. No.: 109,132

[22] Filed: Aug. 19, 1993

[51] Int. Cl.6 ............................................. A01K 3/00
[52] U.S. Cl. ................................ 119/721; 119/908
[58] Field of Search .............. 119/720, 721, 859, 908

[56] References Cited

U.S. PATENT DOCUMENTS

| | | | |
|---|---|---|---|
| 2,023,950 | 12/1935 | Carter . | |
| 2,703,344 | 3/1955 | Anderson . | |
| 2,741,224 | 4/1956 | Putnam . | |
| 2,800,104 | 7/1957 | Cameron et al. | 119/908 X |
| 2,996,043 | 8/1961 | Pettingill | 119/908 X |
| 3,589,337 | 6/1971 | Doss | 119/908 X |
| 3,608,524 | 9/1971 | Waltz . | |
| 3,777,712 | 12/1973 | Gardner et al. . | |
| 3,827,403 | 8/1974 | Meyer | 119/720 |
| 3,897,753 | 8/1975 | Lee et al. . | |
| 3,980,051 | 9/1976 | Fury | 119/720 X |
| 3,983,483 | 9/1976 | Pando . | |
| 4,202,293 | 5/1980 | Gonda et al. . | |
| 4,335,682 | 6/1982 | Gonda . | |
| 4,337,726 | 7/1982 | Czekajewski et al. | 128/782 X |
| 4,539,937 | 9/1985 | Workman | 119/859 X |
| 4,745,882 | 5/1988 | Yarnall, Sr. et al. | 119/721 |
| 4,765,276 | 8/1988 | Kime | 54/71 X |
| 4,766,847 | 8/1988 | Venczel et al. | 119/721 |
| 4,898,120 | 2/1990 | Brose | 119/721 |
| 4,967,695 | 11/1990 | Giunta | 119/721 |
| 4,969,418 | 11/1990 | Jones | 119/908 X |
| 5,067,441 | 11/1991 | Weinstein | 119/721 |
| 5,121,711 | 6/1992 | Aine | 119/721 |
| 5,170,149 | 12/1992 | Yarnall, Sr. et al. | 119/721 |

*Primary Examiner*—Robert P. Swiatek
*Attorney, Agent, or Firm*—Dann, Dorfman, Herrell and Skillman

[57] ABSTRACT

A system for controlling an animal includes a radio signal receiver unit which is attached to the animal. The receiver includes an antenna assembly, a resonant filter, an amplifier, and a transducer for applying a motivational stimulus to the animal. A microcontroller selectively activates the components of the receiver according to a control sequence. The microcontroller performs a multi-stage authentication procedure in order to determine the presence of characteristic properties of the received signal prior to operating the transducer. The transducer includes a speaker circuit for applying audible stimulation, and a transformer circuit for applying electrical stimulation. The type of stimulation and the duration of stimulation may be selected according to control parameters used in conjunction with the control sequence.

36 Claims, 7 Drawing Sheets

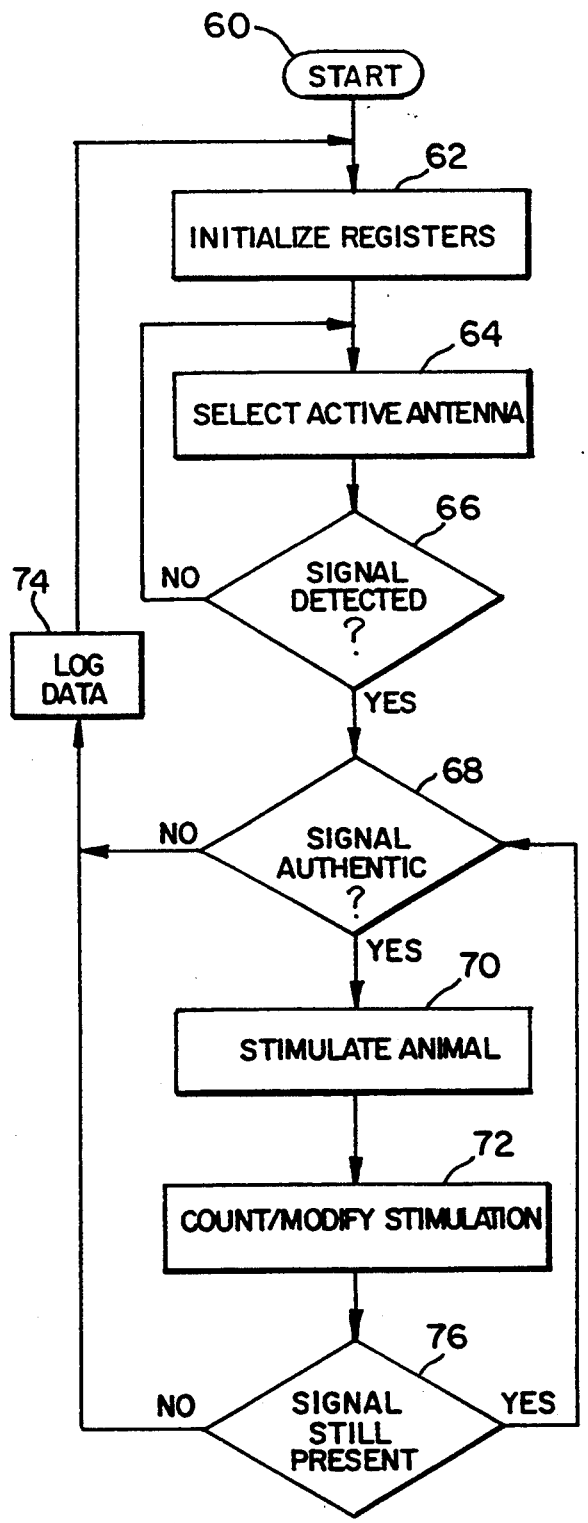
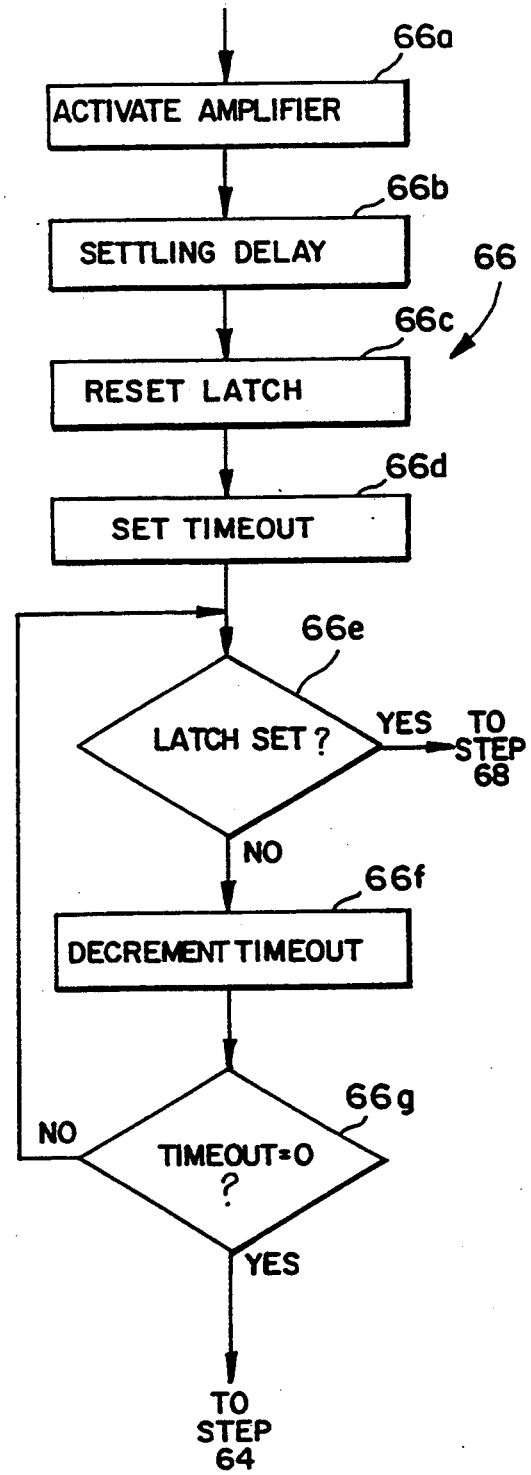
FIG. 3A                    FIG. 3B

ANIMAL CONTROL DEVICE

FIELD OF THE INVENTION

The present invention relates to a device for controlling the movement of an animal relative to a selected area. More particularly, the invention relates to an electronic receiver device for applying a motivational stimulus to the animal in response to a characteristic radio signal emitted by a transmitter having an antenna defining the selected area.

BACKGROUND OF THE INVENTION

Electronic animal control systems have been employed wherein a radio receiver is mounted upon an animal in order to detect a signal from a radio transmitter and to deliver a stimulus to the animal in response to the received signal. It is desirable for such a radio receiver to be compact and to use as few parts as possible. Since such receivers usually operate on battery power, it is also desirable to reduce the amount of electrical power that is consumed within the receiver. The use of orthogonal antennae within such receivers may be desirable to provide more uniform reception relative to receivers utilizing a single antenna. The use of multiple antennae, however, contributes to an increase in the number of parts and to the electrical power consumed within the receiver.

Animals tend to respond poorly to behavioral reinforcement stimuli that are not consistently applied in well-defined circumstances. Electronic animal control systems typically employ an electrical shock as a motivational stimulus. The magnitude of the shock delivered to the animal often depends upon the positioning of the receiver upon the animal and upon other environmental factors such as the presence of moisture upon the skin of the animal. Such factors can detract from the delivery of a consistent shock to the animal. It would therefore be desirable to provide a system for delivering a consistent shock that is insensitive to such environmental conditions. It would also be desirable to provide an animal control system wherein the type of stimulus applied to the animal is readily adaptable to the temperament of the particular animal to be controlled.

In order to avoid accidental application of stimuli in response to spurious or interfering radio signals, it would also be desirable to provide a system for verifying authentic transmitter signals. For this purpose, the detected radio signal may desirably be subjected to a plurality of verification tests to determine the presence within the received signal of a characteristic property of the authentic transmitter signal.

SUMMARY OF THE INVENTION

According to the present invention, a radio signal receiver is provided in an electronic animal control system for controlling the movement of an animal relative to a predetermined area defined by a transmitting antenna that emits a characteristic radio signal. The signal receiver is mounted on the animal to apply a motivational stimulus to the animal in response to the characteristic radio signal emitted by the transmitting antenna in order to control the movement of the animal.

For controlling animal movement relative to a predetermined area, the signal receiver includes a transducer for applying the motivational stimulus to the animal. A resonator is employed having antenna means for converting the radio signal emitted by the transmitting antenna into an electrical signal. An amplifier is provided for amplifying the electrical signal from the resonator to produce an amplified signal. A controller is responsive to the amplified signal for detecting a selected characteristic of the radio signal and for operating the transducer when the selected characteristic is detected. The controller has selection means for selectively activating the antenna means, the amplifier and the transducer to control power consumption within the receiver.

In a specific embodiment, the signal receiver for the electronic animal control system may include a plurality of antennae disposed in different orientations. In order to simplify the receiver circuitry when multiple antennae are employed, all of the antennae are connected with a single resonator which in turn is connected with a single amplifier. A controller generates signals for selectively activating the antennae and for selectively providing power to the amplifier. The amplifier may be in the form of a thresholding amplifier having an input threshold that is selected by the controller. The controller operates according to a control sequence during which the antennae and amplifier are activated only when needed so that electrical power is conserved.

The controller is responsive to the output from the amplifier in order to detect the presence of a received signal. The receiver includes a transducer which may be operated by signals from the controller for applying a selected motivational stimulus to the animal. In order to prevent stimulation of the animal in response to false signals, the controller authenticates the detected signal in accordance with a predetermined set of characteristics, such as the characteristic of a modulation envelope, indicative of an authentic transmitter signal.

The transducer may include audible and electrical stimulation components. When an authentic signal is detected by the controller, the type of stimulation to be applied to the animal may be selected according to a selected combination, or sequence, of audible and electrical stimuli appropriate to the particular animal to be controlled. The controller may also function to record the number or duration of stimuli provided to the animal so that the controller may cease stimulation if a selected maximum number of stimulations has been applied while an authentic signal is present. The controller may also record other data pertaining to the operation of the receiver so that such data may be retrieved and used to evaluate the behavior of the animal and/or the performance of the receiver. The control sequence and/or the stimulation sequence may be changed by the user in response to such data.

The electrical stimulation component of the transducer may be equipped with threshold voltage conduction devices in order to provide a consistent electrical stimulus to the animal. A first threshold device may be utilized to establish a minimum stimulation voltage to ensure that the animal receives adequate stimulation. A second threshold device may also be utilized in order to establish a maximum stimulation voltage to protect the electrical stimulation component from damage due to the generation of excessive voltage.

BRIEF DESCRIPTION OF THE DRAWINGS

The foregoing summary, as well as the following detailed description of the preferred embodiments of the present invention, will be better understood when read in conjunction with the accompanying drawings, in which:

FIGS. 3A-D are logical flow diagrams of procedures executed by the controller of the electronic receiver of the control system of FIG. 1.

DETAILED DESCRIPTION OF THE PREFERRED EMBODIMENTS

Figure 1:
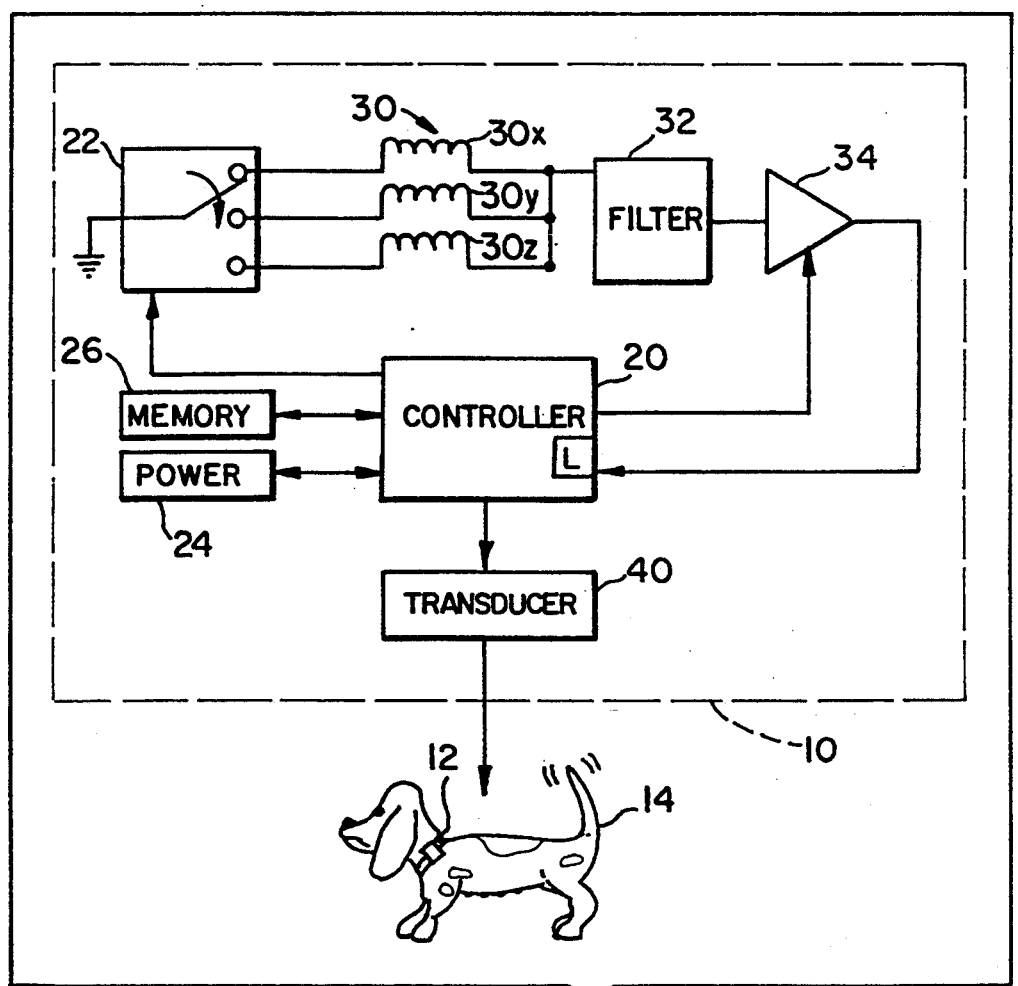
FIG. 1 is a schematic diagram of an electronic animal control system in accordance with the present invention.

An electronic animal control system is shown in FIG. 1 having a transmitting antenna, such as a wire loop antenna 18, that defines the boundary of an area relative to which the movement of an animal 14 is to be controlled. The antenna 18 may define an area in which the animal is to be confined or may alternatively define an area from which the animal is to be discouraged from entering.

The transmitting antenna 18 is connected with a transmitter 16 which generates a characteristic signal. Connection between the transmitter unit 16 and the antenna 18 may be made via a twisted pair section 18a for confining electromagnetic emissions from the twisted pair section 18a so that the antenna 18 may define an area remote from the transmitter 16. The transmitter 16 is preferably of the type marketed by Invisible Fence Company, Inc. of Malvern, Pa.

An electronic receiver 10 is carried by the animal 14, such as by mounting the receiver 10 upon a collar 12. The receiver 10 includes a transducer 40 for applying a stimulus to the animal 14 when the animal approaches the vicinity of the transmitting antenna 18. Operation of the receiver 10 is governed by a controller 20 which executes a sequence of instructions which define the order and conditions under which the controller activates components of the receiver 10. A sequence of instructions executed by the controller 20 and various parameters that define the actions of the receiver 10 may be stored within the controller 20 or within a non-volatile memory 26 with which the controller is operably connected.

The controller 20 is connected with a power supply system 24 so that the controller 20 may selectively provide power to and/or activate components of the receiver, such as a selector switch 22, an amplifier 34, and the transducer 40. The ability of the controller to selectively provide power to the various components of the receiver 10 serves to reduce overall power consumption by the receiver 10 since each of the components of the receiver is activated only when needed.

The selector switch 22 is operated by the controller 20 to selectively activate three mutually orthogonal antennae 30 mounted within the receiver 10, such as inductors 30x, 30y, and 30z. The antennae 30 are connected with a tuned circuit, such as a resonant amplifier or filter 32, so that the receiver is tuned to the desired transmitter signal. The filter 32 functions to filter out undesired signals from the desired transmitter signal.

The amplifier 34 receives the signal, if any, output from the filter 32 and produces an amplified signal which is provided to the controller 20. The controller 20 is connected with the output of the amplifier 34 to detect the presence of the amplified signal produced by the amplifier. The controller 20 preferably incorporates a signal detection latch L or counter mechanism connected with the output of amplifier 34 so that the presence of an amplified signal from the amplifier 34 will be held or stored for a period of time sufficient for the controller 20 to effect asynchronous detection, or sampling, of the amplified signal.

When the controller 20 detects the presence of the amplified signal, the signal is tested to determine whether the signal possesses predetermined characteristics of the expected transmitter signal. If the signal is found to satisfy certain verification criteria, then the signal is authenticated and the controller 20 then operates the transducer 40 in order to apply a motivational stimulus to the animal 14. The transducer 40 may include an electrical stimulator for providing an electrical shock to the animal 14. The transducer 40 may also include an audible stimulator for providing an audible stimulus.

The combination and/or sequence of audible signals and electrical shocks, which may included in the motivational stimulus, may be selected according to control parameters stored within the receiver, such as in the non-volatile memory 26. Thus, the receiver unit 10 may be adapted to control animals of varying temperament according to the selection of appropriate control parameters within the memory that define the motivational stimulus. For example, a large, active breed of dog, such as a Siberian husky, may require a greater degree of stimulation relative to a more trainable breed of dog, such as a basset hound, in order to be discouraged from approaching the transmitting antenna 18.

The controller 20 operates according to a selected control procedure as shown in FIG. 3A. The controller may be programmed to count and/or record data such as the number of times that the animal has approached the transmitting antenna, the length of time that the receiver has been in service, and other information relating to the operational history of the receiver.

Upon starting at step 60, the controller proceeds to step 62 wherein several registers such as event counters and time-out counters are initialized according to values stored within the memory 26.

Registers for containing operational control parameters may also be initialized during step 62. Such control parameters may define the maximum number of stimulations to be applied to the animal, the type of stimulation that is to be applied, and other control functions discussed hereinafter. The controller then proceeds to step 64 wherein the selector switch 22 is operated to activate at least one of the antennae 30. An antenna may be activated by the controller by causing the selector switch 22 to connect the selected antenna to ground. The non-selected antenna or antennae are provided with an open circuit condition by the selector switch 22. Antennae, or a single antenna, may be activated within step 64 according to a sequential scanning procedure, for example, wherein the scanning sequence is advanced with each successive execution of step 64. The sequence of antenna activation may be selected so that each of the three antennae is successively activated or the sequence may be changed so that certain antennae are activated more frequently than others.

After activation of a selected antenna in step 64, the controller then proceeds to step 66 wherein a determination is made as to whether or not a signal has been detected by the antenna selected in step 64. If no signal is detected in step 66, the controller returns to step 64 to activate the next antenna or antennae in the selected scanning sequence. If, in step 66, a signal is detected from the selected activated antenna, then the controller proceeds to step 68 for signal authentication.

A more detailed procedure by which the signal detection step 66 may be implemented is shown in FIG. 3B. Beginning at step 66a, the controller 20 activates the amplifier 34 by providing power to the amplifier. The controller may also select a desired amplifier sensitivity, such as a selected gain or threshold level for the amplifier. The ability of the controller to select the sensitivity of the amplifier allows the receiver to provide a motivational stimulus that can be varied in dependence upon the distance of the animal from the transmitting antenna 18. The selected amplifier sensitivity may, for example, be varied in steps of increasing sensitivity during each antenna scan until either maximum sensitivity is reached or a signal is detected. Each of the sensitivity ranges may generally define a particular zone of distance from the transmitting antenna 18. The controller 20 may be programmed to utilize selected control parameters pursuant to the selected amplifier sensitivity at which a signal is detected.

Proceeding to step 66b, the controller 20 executes a delay step during which any transient signals caused by activation of the selected antenna and the amplifier may be given sufficient time to dampen. Then, in step 66c, the latch L by which the controller samples the amplified signal is reset so that the effect of any transient signal is cleared from the latch. The controller 20 is then prepared to detect the presence of a signal according to the latch becoming set. Each selected antenna in the sequence is preferably activated for a predetermined detection interval during which the signal, if any, received by the activated antenna is supplied through filter 32 to amplifier 34 so that the controller may detect the presence of an amplified signal from the amplifier. Proceeding to step 66d from step 66c, the controller 20 sets a loop counter which is a control parameter that determines the detection time interval.

Proceeding from step 66d, the controller 20 begins a detection loop in step 66e wherein the signal detection latch L is sampled to determine whether a signal has been detected. In embodiments wherein the detection latch L includes a counter, the test performed in step 66e may include examining the value of the counter in order to determine whether the latch has recorded a selected number of signal transitions received from the amplifier 34. If the test performed in step 66e indicates that no signal has been detected, then the controller proceeds to step 66f, wherein a time-out counter is decremented. Then, in step 66g, the time-out counter is examined to determine whether the detection interval has expired. If, in step 66g, the detection interval has expired, then the controller 20 returns to step 64 in order to activate the next antenna in the selected sequence. Otherwise, the controller 20 returns to step 66e. The controller will repeat steps 66e, 66f, and 66g until a signal is detected in step 66e or time-out is reached in step 66g. If a signal is detected during step 66e, then the controller 20 proceeds to step 68 as shown in FIG. 3a in order to authenticate the received signal.

Figure 2:
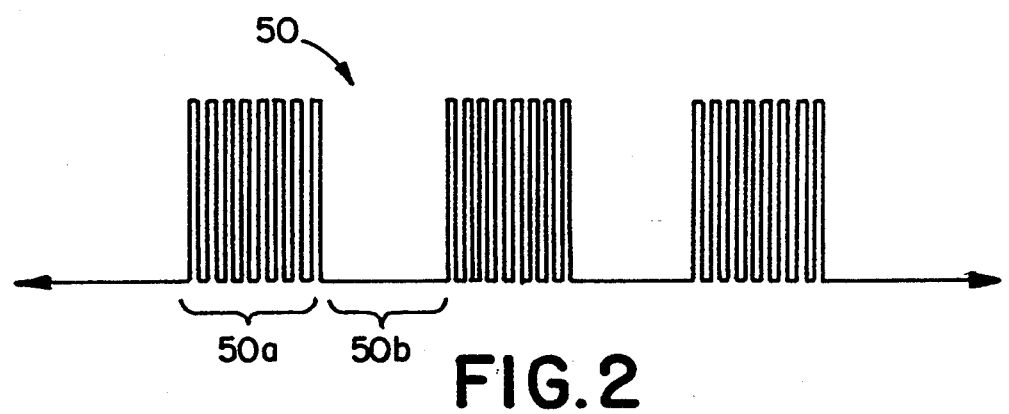
FIG. 2 is a graph of a characteristic radio signal emitted by the transmitter of the control system of FIG. 1.

In step 68, the controller 20 determines whether or not the detected signal possesses predetermined characteristics corresponding to an authentic signal from the transmitter 16. The transmitter signal 50 preferably possesses well-defined temporal characteristics, such as a particular carrier frequency and modulation frequency. As shown in FIG. 2, the transmitter signal 50 is composed of a 10 kHz square wave modulated by a 30 Hz square wave. Such modulation results in a signal characterized having an active interval 50a wherein the 10 kHz component is active for approximately 17 milliseconds. The active interval is followed by an inactive interval 50b wherein the signal amplitude remains essentially 0 for approximately 17 milliseconds. Since the signal generated by the transmitter may vary according to the age of the transmitter, the tolerance of the transmitter components, and environmental conditions, the signal authentication step 68 incorporates tolerances which are wide enough to authenticate signals wherein the high frequency component may vary from approximately 9 to 11 kHz and the low frequency component, i.e., the modulation envelope of the carrier signal, may vary from about 25 Hz to about 35 Hz. In order to permit such a wide variation of the transmitted signal while still rejecting spurious signals, the signal authentication step 68 preferably includes a multi-stage verification procedure in which a particular temporal sequence of the transmitted signal including successive active and inactive intervals of the transmitted signal is detected.

Figure 3C:
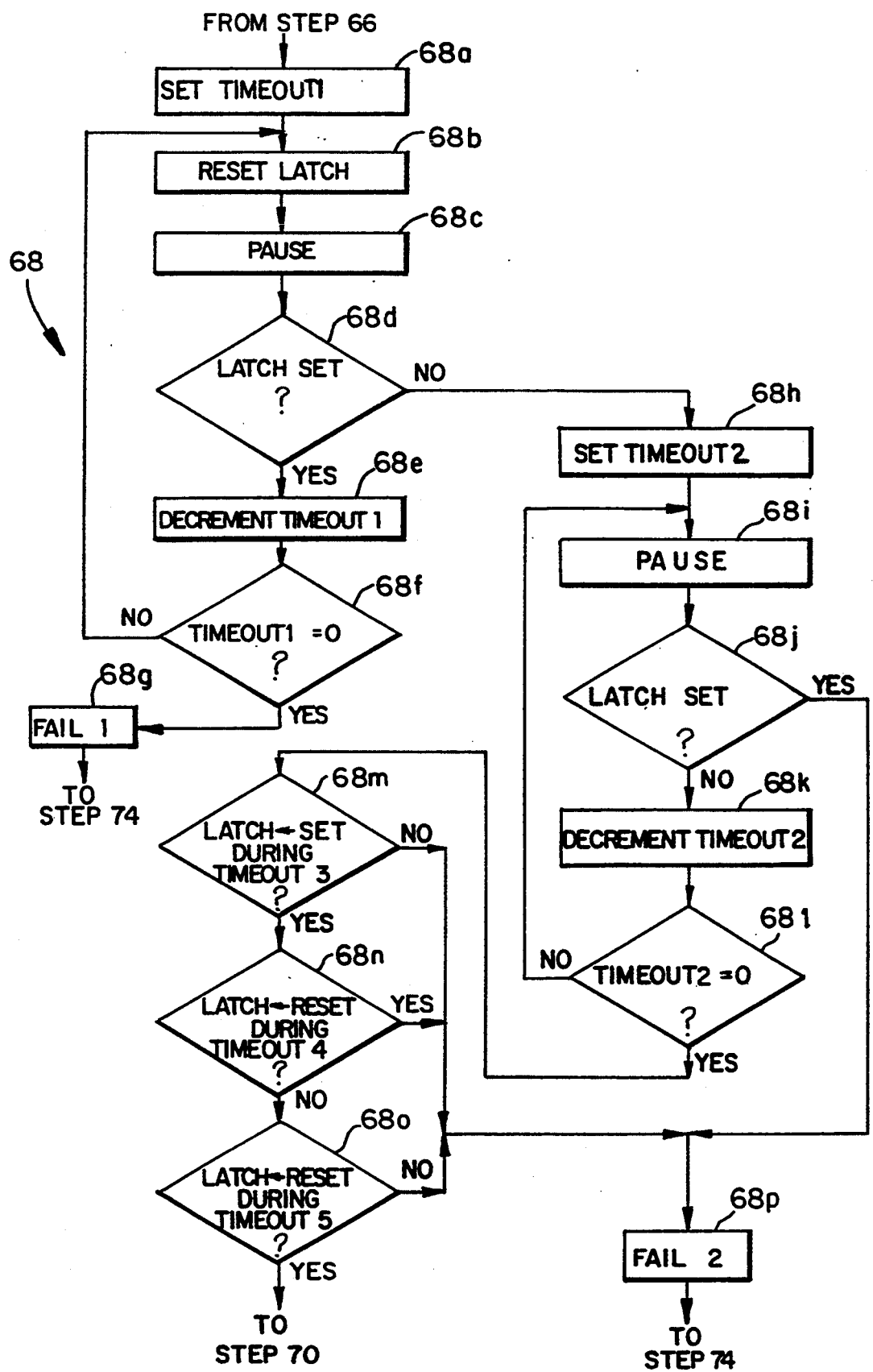

A suitable signal authentication procedure corresponding to step 68 of FIG. 3a is shown in FIG. 3c. Upon entry from step 66 wherein a signal has been detected, a first time-out counter is set in step 68a. The first time-out counter, TIMEOUT1, controls a first verification loop which detects the onset of the inactive portion of the detected signal at any time within a 20 millisecond time-out interval. The 20 millisecond interval is selected to permit verification of a modulation signal having a frequency of at least 25 Hz. The first verification loop proceeds from step 68a to step 68b wherein the signal detection latch L of the controller is set to 0. From step 68b, the controller 20 proceeds to step 68c wherein execution is momentarily suspended, such as by a series of null operation instructions. From 68c, the verification loop proceeds to step 68d wherein the controller determines whether the signal detection latch L was set during step 68c. If, in step 68d, it is determined that the signal detection latch L has been set, then the received signal is still active and the controller 20 proceeds to step 68e wherein the time-out counter is decremented. From step 68e, the controller 20 proceeds to step 68f wherein it is determined whether the first time-out interval has elapsed. If the first time-out interval has not elapsed, then the controller 20 returns to step 68b. If, in step 68f, it is determined that the time-out interval has elapsed, then a signal has been detected which has an active interval longer than 20 milliseconds. Since the authentic transmitter signal possesses an active interval which is at most 20 milliseconds long, then a time-out condition detected in step 68f is an indication that a false signal has been detected. Upon detection of a false signal in step 68f, the controller 20 proceeds to step 68g wherein the failure to pass the first verification test may be recorded or added to a count of such false detected signals, and the amplifier may be turned off. From step 68g, the controller 20 proceeds to step 74 to log any selected data about the false signal detected.

If, in step 68d, the signal detection latch L is not set, then the received signal has become inactive during the first time-out interval and the first verification step has been passed indicating that the modulation frequency of the detected signal is above 25 Hz. The controller 20 then proceeds to step 68h to begin a second verification loop wherein the detected signal is tested for a second time-out interval, such as 14 milliseconds, to determine whether the detected signal remains inactive for the second time-out interval. The second time-out interval is determined according to a time-out counter, TIMEOUT2, set in step 68h. From step 68h, the controller proceeds to step 68i wherein execution may be momentarily paused. The pause step 68i is optional during this second verification loop. During verification loops such as in 68a-f wherein the controller 20 is verifying an active phase of the detected signal, it may be desirable to include such a pause so that the detection latch L may be provided with sufficient time to become set or accumulate a count of the number of carrier signal oscillations detected during the pause. During verification loops such as in 68h-l wherein the controller 20 is verifying an inactive phase of the detected signal, such a pause may not be necessary since only a single detection oscillation may be sufficient to disqualify the detected signal. In an environment which poses significant radio interference, however, it may be desirable to verify inactive portions of the signal by determining that the number of detected oscillations is below a selected value determined according to the carrier frequency and the operating speed of the controller.

From step 68i, the controller 20 proceeds to step 68j wherein the detection latch L is examined to determine whether it has been set by a detected signal. If the latch has not been set, the controller 20 proceeds from step 68j to step 68k wherein TIMEOUT2 is decremented, and then to step 68l wherein it is determined whether the second time-out interval has elapsed. If the second time-out interval has not elapsed, the controller 20 returns to step 68i. If, in step 68l, it is determined that the second time-out interval has elapsed, then the detected signal has remained inactive for 14 milliseconds, thus passing the second verification test thereby representing that the modulation frequency of the detected signal is less than approximately 35 Hz. The controller 20 proceeds from step 68l to a third verification step 68m if the second time-out interval has expired. If, however, in step 68j, it is determined that the signal has become active at any time during the 14 millisecond second verification interval, then the frequency of the modulation envelope exceeds 35 Hz and the controller 20 proceeds from step 68j to step 68p wherein the failure to pass a verification step beyond the first verification step may be recorded in a false signal event counter.

The third verification loop, shown as a single decision step 68m in FIG. 3c, is structured similarly to the second verification loop 68h-l. During the third verification test 68m, a time-out interval, TIMEOUT3, of 6 milliseconds is established during which a return to an active signal is detected. If, during step 68m, the detected signal does not return to an active condition during the 6 millisecond third time interval, then the detected signal will have remained inactive for a total of at least 20 milliseconds comprising the 14 milliseconds from the second verification loop and an additional 6 milliseconds for this third verification loop and the controller 20 will proceed to step 68p to record a false signal event. If, during step 68m, the detected signal does return to an active condition, then the third verification test is passed and the controller proceeds to step 68n for a fourth verification loop.

During step 68n, a fourth time-out interval, TIMEOUT4, of 14 milliseconds is established during which the signal detection latch L is cyclically reset and then tested to determine whether the latch remains in the reset condition. The fourth verification loop, shown as a single decision step 68n in FIG. 3c, is structured similarly to the first verification loop 68a-f. If, at any time during the fourth time-out interval the detection latch L remains in the reset condition signifying that a signal is no longer being detected, then the fourth verification test is failed and the controller proceeds to step 68p to record a false signal event. If, during step 68n, the detection latch L does not remain in the reset condition, then the fourth verification test is passed and the controller proceeds to the fifth verification loop of step 68o.

During step 68o, a fifth time-out interval, TIMEOUT5, of 6 milliseconds is established during which the detection latch is repeatedly reset and then tested as to whether the detection latch remains in the reset condition during the fifth time-out interval thus indicating a return to the inactive portion of the expected transmitter signal. If, during step 68o, the detected signal does not return to an inactive condition, then the controller proceeds to step 68p to record a false signal event. If, during step 68o, the detected signal does return to the inactive phase, then the controller proceeds to step 70 to apply a stimulus to the animal.

The multi-stage verification procedure of the type shown in FIG. 3c will produce an affirmative result upon detection of a received signal having, in sequence, an active portion of less than 20 milliseconds followed by an inactive portion ranging from just over 14 milliseconds to just under 20 milliseconds in duration, followed by an active portion ranging from just over 14 milliseconds to just under 20 milliseconds in duration. An additional level of signal verification may be provided in embodiments wherein the detection latch L of the controller 20 incorporates a counter for counting the number of signal transitions produced by the amplifier. For example, during those portions of the verification procedure wherein the received signal is tested for activity, such as in step 68d, it may be required that the latched count exceed a predetermined decision value rather than determining that the latch has merely been set. The decision value would be determined by the length of the pause step 68c, the anticipated frequency of the transmitter signal, and the clock frequency of the controller.

Returning to FIG. 3a, it can be seen that if, in step 68, the signal has been determined to be authentic, then the controller proceeds to step 70 wherein the selected antenna and the amplifier are de-activated and a motivational stimulus may be applied to the animal. The character of the initial stimulus is determined according to control parameters which were initialized in step 62 and selected in accordance with the selected amplifier sensitivity. The controller 20 in step 70 may examine the contents of control registers which were initialized in step 62 to determine the stimulation that the animal is to receive. For example, a stimulation control register may contain a bit used to indicate that the animal is to receive an audible stimulus. Another bit in the stimulation control register may be used to indicate that the animal is to receive an electrical stimulus. The stimulation control register may also include values indicating the number of stimulations or the duration of the stimulations which are to be applied to the animal in step 70. The controller determines the stimulus which is to be applied to the animal and operates the transducer to apply the stimulus.

Proceeding from step 70 to step 72, the stimulation control registers may be modified according to values contained in other control registers. For example, the controller may, in step 72, increment a counter which counts the number of times that stimulation step 70 has been executed. If it is desired, for example, to apply a finite number of electrical shocks to the animal when the animal is within sufficient proximity to the transmitting antenna to effect stimulation, then the stimulation modification step 72 may include a provision to reset the control bit for shocking the animal after the desired number of shocks have been applied. Then, the antenna and the amplifier are re-activated and the controller proceeds to step 76 to determine whether a signal is still present. If the presence of a signal is detected, then the controller returns from step 76 to the signal verification step 68 in order to determine whether the animal is still within the vicinity of the transmitting antenna.

If, in step 68, it is authenticated that the animal is still in proximity to the transmitting antenna, then the controller will again proceed to step 70 to stimulate the animal. If the stimulus control register was altered during step 72 to reset the shock control bit, the animal will not receive a shock in step 70. By counting the number of stimuli which have been applied to the animal and by modifying the type of stimuli which the animal is to receive during successive applications or non-applications of the stimuli, the receiver circuit provides the ability to program a wide variety of motivational control sequences which may be adapted to animals of varying temperament. Additionally, the ability to count and modify the stimuli provides the ability to set an absolute maximum number of stimulations which are to be applied to the animal resulting in a fail-safe condition in the event that the animal should become trapped or otherwise physically restrained within sufficient proximity to the transmitting antenna to trigger the application of the motivational stimulus. The controller may keep a record of the number of fail-safe events as may occur during operation of the receiver so that the owner of the animal may be made aware of the relative tendency of the animal to remain in the vicinity of the transmitting antenna. If the receiver unit logs a large number of fail-safe events, for example, the owner may take appropriate action such as selecting a greater degree of initial stimulation to more strongly discourage the animal from approaching the transmitting antenna.

The cycle of stimulation in step 70, modification of stimulation in step 72, and signal detection and verification in step 76 and 68 continues until, in step 76, a signal is no longer detected or, in step 68, a valid signal is no longer detected. In such instances, the controller proceeds to step 74 wherein data accumulated since the last initialization step is recorded or updated. Such data may include the type of verification failure which was detected during the verification step, the number of stimulations which have been applied to the animal, the number of fail-safe events, and the accumulated time that the receiver has been in service since the last initialization.

Figure 4A:
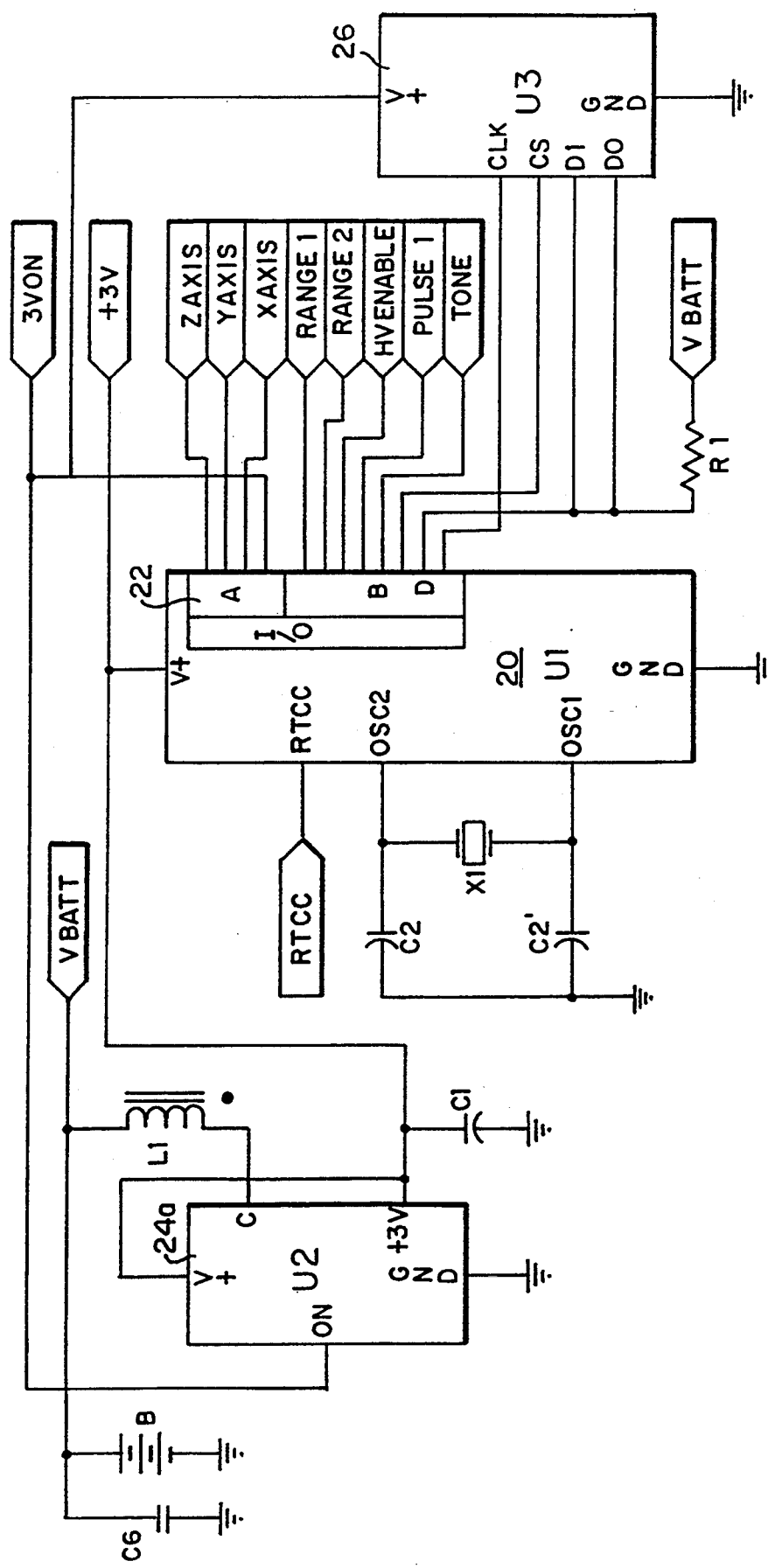
FIGS. 4A-C are schematic diagrams of the receiver circuit of the electronic receiver of the control system of FIG. 1.
Figure 4B:
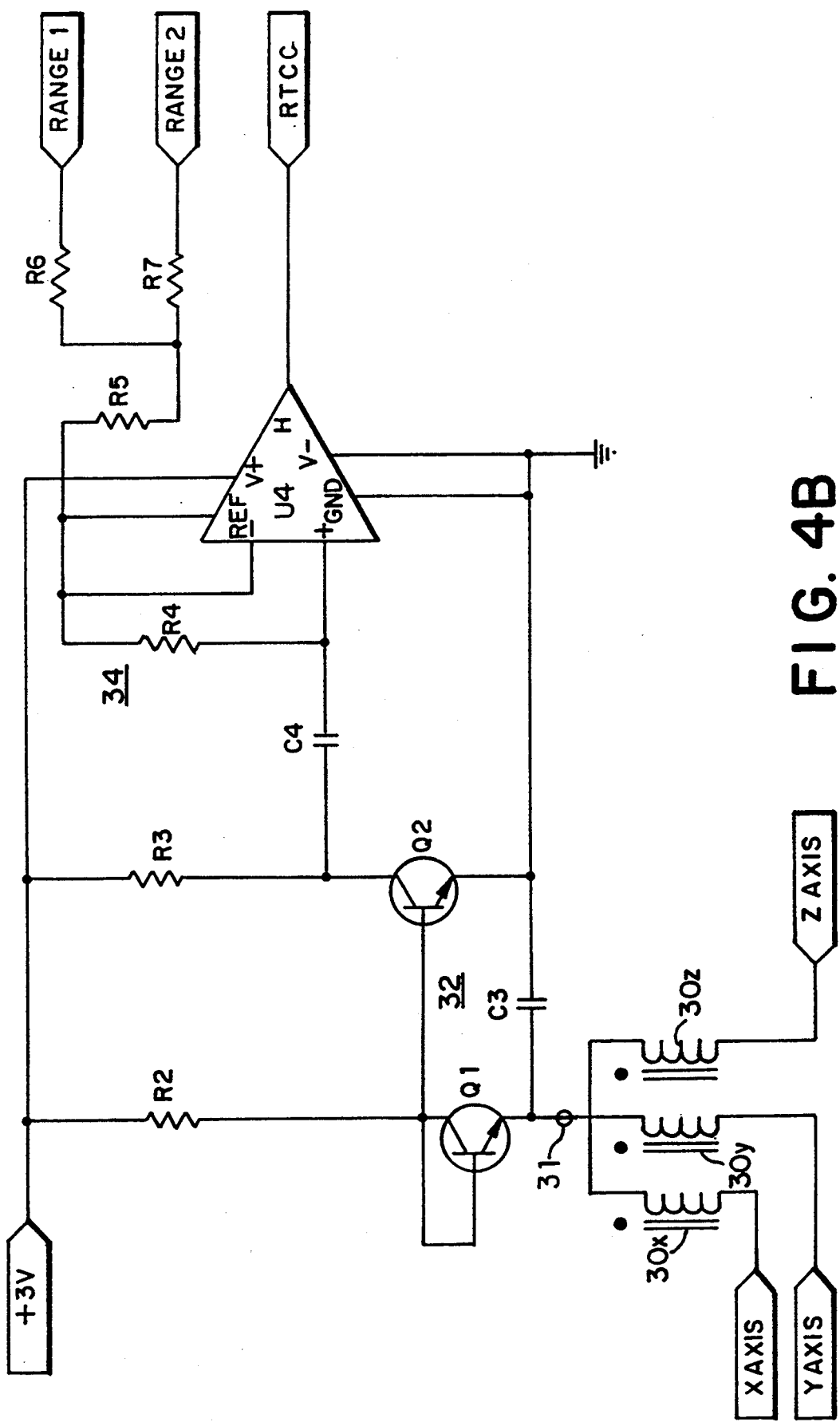
Figure 4C:
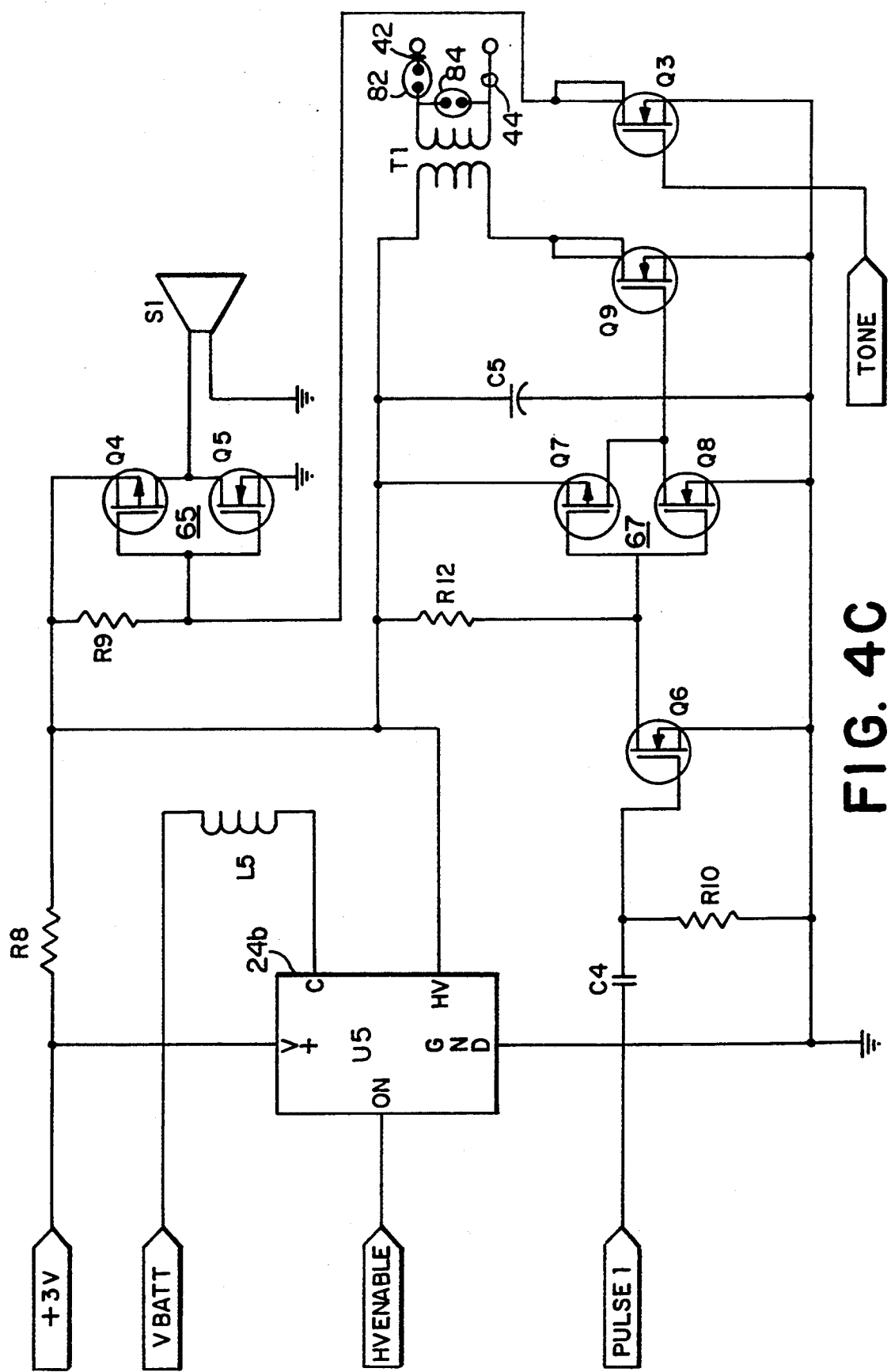

An embodiment of the circuitry for the receiver unit 10 is shown schematically in FIGS. 4A-C. Representative values of the circuit components shown therein are listed in Table 1.

TABLE 1

| | |
|---|---|
| R1, R4, R6, R7 | 2 MΩ |
| R2, R8 | 1 MΩ |
| R3 | 560 kΩ |
| R9, R12 | 100 kΩ |
| R10 | 620 kΩ |
| R5 | 10 kΩ |
| C5 | 220 μF |
| C1, C6 | 100 μF |
| C3 | .0068 μF |
| C4 | 220 pF |
| C2, C2' | 15 pF |
| $L_1$ | 33 mH |
| $L_5$ | 1 mH |
| X1 | 32.768 kHz |
| U1 | PIC16C54 controller |
| U2 | S-8435BF regulator |
| U3 | 93C46 EEPROM |
| U4 | MAX921 comparator |
| U5 | S-8435FF regulator |

Referring to FIGS. 4A-C, the controller 20 may be a microcontroller U1 such as a PIC16C54 microcontroller U1 manufactured by Microchip Technology of Chandler, Arizona. The microcontroller U1 includes a plurality of tri-state bidirectional I/O connections which are logically configured to be addressed as register ports A and B. Register port A is employed to perform the function of the antenna selector switch 22. Three of the I/O pins of port A are used to generate the signals labelled ZAXIS, YAXIS, and XAXIS respectively. In order to selectively activate, for example, the Z-axis antenna, a single word may be written to port A by the microcontroller to drive the ZAXIS signal low while leaving the YAXIS and XAXIS signals in a disconnected state. The remaining I/O pin of port A is used to generate the signal 3VON which is employed for power control purposes. I/O port B includes pins for generating signals RANGE1 and RANGE2 which may be used to establish the operating threshold of the receiver amplifier, HVENABLE which is used to control power to the transducer, PULSE1 which is used to activate the electrical shock component of the transducer 40, and TONE which is used to drive the audible signal component of the motivational transducer 40. The remaining I/O pins of port B are employed to communicate with the nonvolatile memory 26 which is preferably a 1 kbit 93C46 EEPROM U3 manufactured by Microchip Technology. The 93C46 EEPROM U3 utilizes serial input and serial output data communication and thus a single pin D of the microcontroller may be used for both input and output to and from the EEPROM U3 while two other pins of the microcontroller U1 are used to generate the chip select CS and clocking signals CK required to read from and write to the EEPROM. Since use of the EEPROM is not required during all procedures executed in the operation of the receiver, the power supply connection V+ of the EEPROM is connected with the 3VON signal of port A of the microcontroller. Thus, whenever it is desirable to read from or write to the EEPROM, the 3VON pin is activated prior to performing such a read or write so that the EEPROM may be turned off when it is not needed.

The signal detection latch L is provided by a real time clock counter at the RTCC input to the microcontroller U1. The RTCC input connects with a asynchronous latching and counting register that is internal to the microcontroller chip. Oscillator inputs OSC1 and OSC2 of the microcontroller are connected with a crystal oscillator circuit having an oscillation frequency of 32.768 kHz. Such an operation frequency allows the microcontroller to easily keep track of actual time since each instruction cycle at this frequency is a convenient submultiple of a second.

The power supply system includes a battery B which is preferably a 3-volt lithium battery. A capacitor C6 may be connected in parallel with the battery to stabilize the battery voltage. An inductor L1 is connected between the control input C of a voltage regulator 24a and the positive battery voltage, VBATT. The voltage regulator U2 is preferably an S-8435BF step-up CMOS switching regulator manufactured by Seiko Instruments Incorporated of Tokyo, Japan. The voltage regulator 24a provides a stable 3-volt regulated output at the terminal labelled +3 V for battery voltages as low as 0.9 volts. Step-up regulation is achieved by the regulator 24a by an internal controlled oscillator which switches current within the inductor L1. The resulting output voltage is fed back to the input voltage connection V+ for additional stability. In order to prevent electromagnetic emissions from the inductor L1 of the regulator circuit 24a from interfering with radio signal detection, the voltage regulator is only operated intermittently during the control procedure and only when radio signal detection is not being performed. In order to operate the regulator, an on/off input ON of the regulator is connected with the 3VON signal from the microcontroller U1.

A capacitor C1 is connected between the +3 V output of the voltage regulator 24a and ground. Activation of the voltage regulator 24a charges the capacitor C1 which is capable of storing sufficient charge for operating the microcontroller during the signal detection and verification phases of the control procedure. After capacitor C1 is charged, the regulator 24a may be deactivated and the controller U1 may then operate using the capacitor voltage. A fresh nominal 3-volt battery B will provide a voltage somewhat in excess of three volts. When a fresh battery is installed within the receiver, the step-up voltage regulator U2 will pass the actual battery voltage above 3 volts to the +3 V output of the regulator via inductor L1 and an internal diode so that the microcontroller U1 may begin operating.

The battery voltage VBATT is also connected via resistor R1 to the I/O terminal D of port B. I/O pin D is also used to communicate data with the memory 26. The resistor R1 is of a sufficiently high value that data communication between the microcontroller U1 and the memory 26 is not affected by the battery voltage. Such connection of the battery voltage to one of the I/O pins allows the microcontroller to determine when the battery has been removed or when the battery voltage has dropped below the logic low threshold, nominally 1.5 volts, of the microcontroller. Upon detection of a low battery signal, the microcontroller U1 may be programmed to dump accumulated operational data such as event counters and timer values into the nonvolatile memory 26 so that such data will not be lost if the receiver loses power.

The receiving antennae 30, resonant filter 32, and thresholding amplifier 34 are shown in FIG. 4B. The antenna assembly includes three mutually orthogonal inductors 30x, 30y, and 30z. The inductors are all connected to a common node at terminal 31 and to respective control signal lines XAXIS, YAXIS, and ZAXIS at the other terminal of each inductor. A capacitor C3 is connected between the terminal 31 and ground. The capacitor C3, in combination with whichever of the inductors is activated, forms an LC resonator tuned to the carrier frequency of the expected transmitter signal.

The common connection terminal 31 of the antennae is also connected with the emitter of transistor Q1 which may be a 2N5089 NPN transistor. The base and collector of transistor Q1 are connected with the +3 V power line via resistor R2 thus amplifying the resonant signal developed at the common connection terminal 31 of the antennae 30x, 30y, and 30z.

The collector and base of transistor Q1 are connected to the base of transistor Q2 which may also be a 2N5089 NPN transistor configured as a common emitter amplifier having its collector connected with the +3 V power line via bias resistor R3. The collector of transistor Q2 is capacitively coupled via capacitor C4 to a noninverting input of thresholding amplifier U4. The thresholding amplifier U4 is preferably a MAX921 ultra-low power comparator manufactured by Maxim Integrated Products. The thresholding amplifier U4 serves to compare signals received upon the non-inverting input to an internal 1.18 volt reference and to produce a saturating output upon the RTCC signal line in response to input voltages exceeding the reference level. The comparison is performed according to an adjustable hysteresis range that is determined in part by resistor R5 which is connected between the hysteresis input of the amplifier U4 and the inverting input of the amplifier U4. Resistors R6 and R7, which are connected between the hysteresis input and respective signal lines RANGE1 and RANGE2, also serve to determine the hysteresis levels of the amplifier depending upon whether RANGE1 or RANGE2 is asserted. Thus, the sensitivity of the thresholding amplifier U4 may be controlled via signal lines RANGE1 and RANGE2 to produce a saturating output on the RTCC line according to a selected hysteresis level. In embodiments wherein multiple threshold levels is not desired, a single RANGE signal may be used to activate the amplifier threshold. The spare I/O pin thus obtained may then be used to perform the battery testing functions of I/O pin D.

Each of the amplifier sensitivity settings determined by assertion of signals RANGE1 or RANGE2 may be associated with a different stimulus control register value. For example, the controller may be programmed to apply only an audible signal when the amplifier is operated at a relatively low threshold in accordance with the associated low threshold control register value. In this manner, the type of stimulus applied to the animal may be selected in accordance with the strength of the received signal so that the stimulus may be increased in character as the animal moves closer to the transmitting antenna. In order to provide a greater number of range settings, the signals RANGE1 and RANGE2 may alternatively be connected with address inputs of a 2:4 demultiplexer. The output connections of the demultiplexer would then be connected with the hysteresis input of the amplifier via a set of resistors having a range of values. A still greater number of range settings may be achieved via the use of a larger demultiplexer wherein the RANGE1 and RANGE2 inputs are used to clock a serial address into a shift register controlling the demultiplexer in order to activate a particular amplifier sensitivity range.

In FIG. 4C there is shown a schematic diagram of a motivational transducer 40. The transducer includes components for selectively producing audible and/or electrical stimulation. In order to allow the transducer components to produce sufficiently energetic stimulation to affect the behavior of the animal, a voltage regulator 24b is connected to provide power at a relatively high voltage, such as 12 volts, to the transducer components. The voltage regulator 24b is preferably an S-8435FF CMOSS step-up switching regulator U5 manufactured by Seiko Instruments Incorporated of Tokyo, Japan. The regulator 24b is powered by the VBATT signal line and is controlled by an inductor L5 connected between a control input C of the regulator and VBATT. The regulator 24b may be switched on or off in response to the HVENABLE signal from the microcontroller U1 so that the regulator U5 is preferably activated only when a motivational stimulus is to be applied to the animal.

In order to cause the transducer 40 to produce an audible stimulus, the microcontroller U1 asserts the HVENABLE signal and then toggles the TONE signal at a rate which determines the frequency of the sound to be produced. The TONE signal line from the microcontroller is connected with the gate of field-effect transistor (FET) Q3. The drain connection of FET Q3 is grounded and the source connection of FET Q3 is connected with the HV output of the regulator U5 via resistor R9. The source terminal of FET Q3 is also connected with the gates of a complementary FET pair 65 comprising transistors Q4 and Q5. The complementary pair 65 is connected to drive a speaker, such as piezoelectric speaker S1, thus producing the desired audible signal.

In order to produce an electrical shock stimulus, the microcontroller U1 initiates the following sequence of operations. The HVENABLE signal is asserted, causing regulator U5 to produce a high-voltage output at the HV terminal. The high-voltage output of regulator U5 charges capacitor C5. The HVENABLE line remains asserted by the microcontroller U1 for a period of time sufficient to charge capacitor C5. When this charging delay has elapsed, the microcontroller turns off the HVENABLE line. With capacitor C5 charged, the electrical transducer 40 is prepared to apply an electrical shock stimulus to an animal. In order to cause the stimulus to be applied, the microcontroller asserts signal PULSE1. Signal PULSE1 is capacitatively coupled, via capacitor C4, to the gate of FET Q6. The gate of FET Q6 is also connected to ground via a pull-down resistor R10 to prevent accidental pulse triggering. The drain of FET Q6 is connected to ground and the source of FET Q6 is biased via resistor R12 which is connected to the HV output of regulator U5. The source of FET Q6 is also connected with the gates of a complementary FET pair 67 comprising FETs Q7 and Q8. The complementary pair 67 also provides a consistently sharp turn-on signal to FET Q9 which is connected between a primary terminal of transformer T1 and ground. The other primary terminal of transformer T1 is connected to the HV signal line. When FET Q9 has been turned on, capacitor C5 will begin to discharge through the primary coil of transformer T1. The microcontroller U1 then asserts signal PULSE1 in order to cause capacitor C5 to begin to discharge through the primary of transformer T1. The gate voltage of FET Q6 will be driven high by activation of PULSE1 and the voltage will then decay according to the time constant of R10 and C4. This decay time may be selected to correspond to the time required for maximum current to be developed within the primary coil of transformer T1. When FET Q6 is turned off by decay of the gate voltage, complementing pair 67 will switch off FET Q9 thus interrupting the current in the primary of the transformer. The interruption of current in the primary circuit of the transformer T1 due to switching off Q9 causes a high voltage, such as 1.2 Kv to be developed between the terminals 42 and 44 of the secondary coil of transformer T1. During stimulation applications wherein only an audible stimulus is applied, the capacitor C5 will also be charged. In order to protect capacitor C5 from damage due to self-discharge and to recover the unused charge, a resistor R8 may be connected between the HV line and the +3 V line. The resistor R8 is of a sufficiently high value to allow capacitor C5 to discharge without significantly increasing the voltage on the +3 V line. In alternative embodiments, the source of the complementary pair of FETS Q7 and Q8 may be connected via a resistor to the gate of FET Q6 in order to lock FET Q6 into an "on" condition when a pulse has been received via signal line PULSE1. The microcontroller may then pause for a sufficient period of time for maximum current to develop in the primary. After such a delay, the microcontroller U1 returns signal PULSE1 to a low condition thus causing a negative voltage spike to be transmitted to the base of transistor Q6 via capacitor C4. The negative voltage spike applied to the base of FET Q6 will cause the complementary pair 67 to rapidly switch FET Q9 to an "off" condition.

The secondary terminals 42 and 44 of transformer T1 are connected with a pair of contacts which are held against the skin of the animal. Thus, the high voltage developed across the secondary terminals of transformer T1 will cause an unpleasant sensation, such a momentary muscle contraction, to be felt by the animal.

It has been found that the effectiveness of electrical stimulation produced by transducer 40 can vary greatly depending upon environmental characteristics such as moisture on the animal's skin in the area of the electrical contacts. Under normal, dry conditions, the electrical characteristic between two terminals placed against an animal's skin, such as upon a dog's neck, is of the "crowbar" type wherein a large voltage is developed between the terminals until a threshold voltage is reached at which point a low-resistance path between the terminals is established by subcutaneous ionic conduction. Under moist conditions, however, a conduction path may be established upon the skin surface between the electrical contacts which will prevent the subcutaneous threshold voltage from being reached. In order to reduce this undesirable effect, a threshold voltage conduction device, such as a spark gap 82, may be connected in series between one of the transformer secondary terminals and one of the skin contacts. Such a series-connected threshold device preferably has a threshold voltage below the subcutaneous threshold yet sufficient to prevent conduction between the skin contact terminals before the subcutaneous threshold has been reached.

Another undesirable effect associated with electrical shock production is that, if the skin contacts are disconnected from the animal or poorly connected to the animal, then the resulting high resistance path between the secondary terminals of the transformer may cause a voltage to be developed between the secondary transformer terminals that is high enough to damage the transformer. In order to prevent such damage to the transformer, FET Q9 may include a threshold voltage conduction device between the drain and source terminals to clamp the primary voltage to a level that is low enough to prevent damage to the transformer. Alternatively, a second threshold voltage conduction device, such as a spark gap 84, may be connected in parallel across the secondary terminals of the transformer. The parallel-connected threshold voltage conduction device preferably has a threshold voltage that is well in excess of the subcutaneous threshold voltage of the animal so that the parallel threshold device serves to prevent damage to the secondary terminals of the transformer without detracting from the effectiveness of the electrical shocks to be applied to the animal.

Figure 3D:
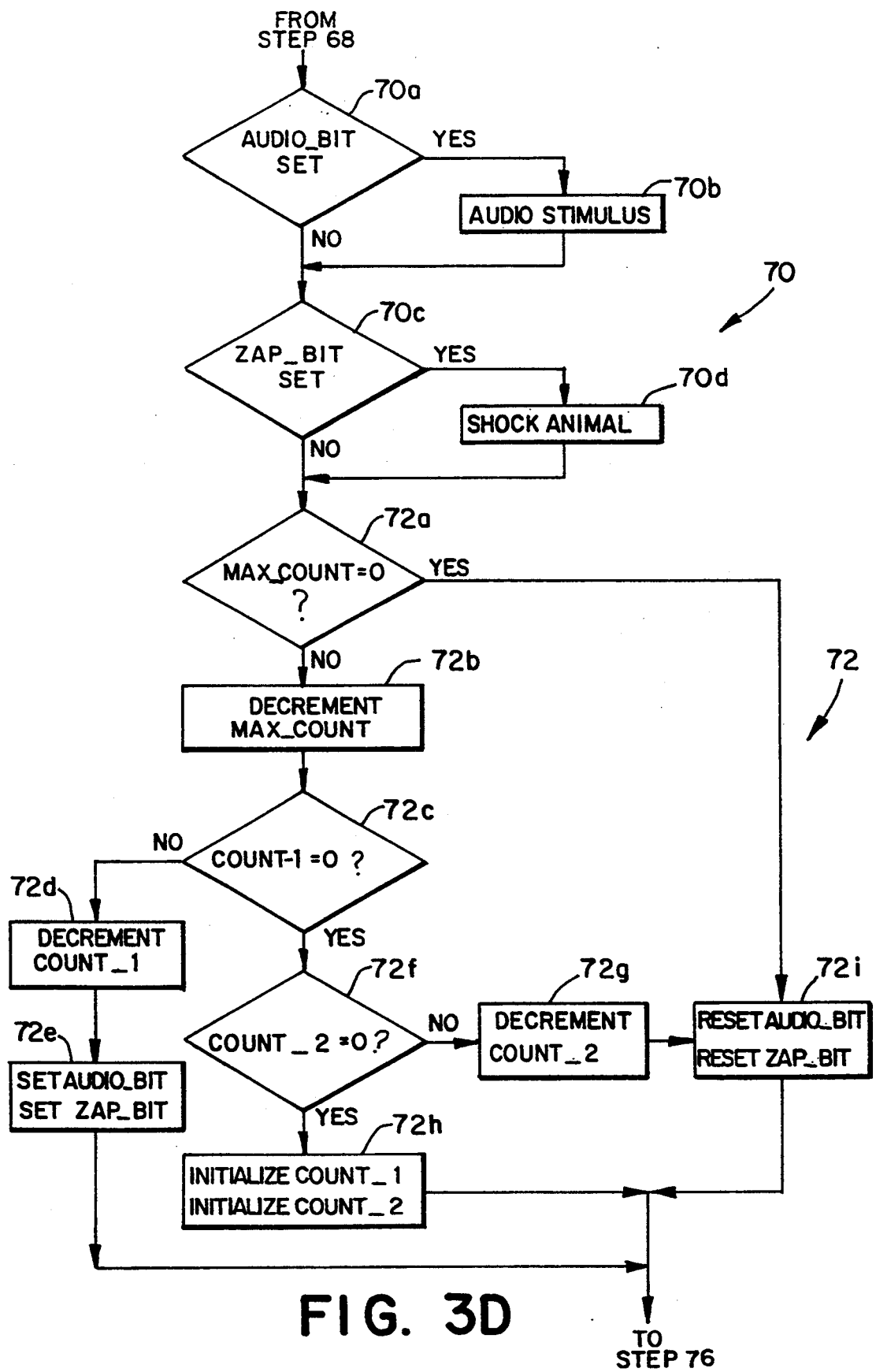

Referring now to FIG. 3D, there is shown a more detailed flow diagram showing how the stimulation step 70 and the stimulation modification step 72 may be controlled via the use of counters and other stimulation control registers. Step 70 is divided into steps 70a–d, and step 72 is divided into steps 72a–g.

Upon entry to step 70a from step 68, the controller 20 tests whether an audio control register, AUDIO_BIT, is set. If AUDIO_BIT is set, the controller proceeds to step 70b in which an audible stimulus is generated. After the audible stimulus has been generated, or if AUDIO_BIT was not set during step 70a, the controller proceeds to step 70c. In step 70c, the controller determines whether an electrical control register, ZAP_BIT, is set. If ZAP_BIT is set, the controller proceeds to step 70d wherein an electrical stimulus is applied to the animal. After step 70d, or if ZAP_BIT was not set during step 70c, the controller proceeds to the stimulation modification step 72 beginning at step 72a. The initial values of AUDIO_BIT and ZAP_BIT registers may be retrieved from nonvolatile memory 26 and stored in a soft register when the controller 20 is initialized as in step 62. Additional control registers may be used to store loop counters to be utilized in steps 70b and/or 70d if it is desired to apply a plurality of audible and/or electrical stimuli during each execution of step 70.

In step 72a, a register MAX_COUNT is decremented. MAX_COUNT may be initialized during step 62 to contain a predetermined number of maximum stimuli which are to be applied to the animal so that fail safe operation is provided if the animal remains within the detection of the receiver for an extended period of time. If, in step 72a, MAX_COUNT is found to be zero, then the controller 20 proceeds to step 72i wherein the AUDIO_BIT and ZAP_BIT registers are reset so that no further stimulation will be applied to the animal if a valid signal is still present.

If, in step 72a, MAX_COUNT is not zero, then the controller 20 proceeds to step 72b wherein MAX_COUNT is decremented. From step 72b, the controller proceeds to step 72c wherein another counter, COUNT_1, is tested to determine whether it is zero. COUNT_1 is a control register which determines the duration of the stimulation applied to the animal or the number of times that step 70 is executed. If, in step 72c, COUNT_1 is not equal to zero, then the controller proceeds to step 72d wherein COUNT_1 is decremented. Then, in step 72e, the control bits AUDIO_BIT and ZAP_BIT may be set and the controller exits step 72 so that upon subsequent execution of step 70, audible and electrical stimulation will continue to be applied to the animal.

If, in steps 72c, COUNT_1 is equal to zero, then the controller proceeds to step 72f wherein a counter, COUNT_2, is compared to zero. COUNT_2 may be used in conjunction with COUNT_1 to provide alternating intervals of stimulation and nonstimulation applied to the animal when the animal is in the vicinity of the transmitting antenna. If, in step 72f, COUNT$_{13}$ 2 is not equal to zero, then the controller proceeds to step 72g wherein COUNT_2 is decremented. From step 72g, the controller proceeds to step 72i wherein AUDIO_BIT and ZAP_BIT are reset so that subsequent execution of step 70 will result in no stimulation applied to the animal. No stimulation will be applied for the period set by COUNT$_{13}$ 2.

If, in step 72f, COUNT_2 is found to be equal to zero, then the controller may proceed to step 72h wherein COUNT_1 and COUNT$_{13}$ 2 may be reinitialized to predetermined values stored in the nonvolatile memory 26. Upon completion of step 72, the controller proceeds to step 76. Additional functions may be included in the execution of step 72 such as recording the number of stimulations applied to the animal and reactivating the selected antenna and the amplifier prior to proceeding to step 76.

In a preferred embodiment, the values COUNT_1 and COUNT$_{13}$ 2 are selected to provide alternating ten second intervals of stimulation and nonstimulation. Additionally, the variable MAX_COUNT is selected to limit the periods of stimulation to three successive ten second periods. Since the controller operates at a clock frequency that is an integral power of two, the instruction cycle of the controller and hence, the various counters as may be used in the execution of the control procedure, can be easily correlated with actual elapsed time.

When the receiver unit 10 is initially programmed, the sequence of operational instructions and the control parameters which define the type of motivation to be applied to the animal are loaded into the non-volatile memory or into an internal memory of the microcontroller. The receiver circuitry is then preferably hermetically sealed within an enclosure that can be mounted upon the animal. After the receiver has been in service, it may become desirable to retrieve accumulated data, alter the control parameters, or modify the control program itself. For example, the owner of an animal may wish to know how many motivational stimuli were applied to the animal during a given period of time. In addition, it may be desirable to retrieve the number of recorded false signal events in order to correct radio interference problems.

Retrieval of information from the receiver unit and alteration of information within the receiver unit may be accomplished in several ways. The simplest approach is to remove the memory and/or the microcontroller from the receiver unit and to use conventional electronic equipment to read and/or write to these components. However, it may be desirable to permanently seal the receiver circuit within a housing. In such instances, the receiver circuitry permits communication with external devices via the transmitter, the battery connection VBATT, and/or the speaker S1.

In a first embodiment of a system for communicating information with the receiver circuit, a second signal verification algorithm is incorporated into the control program in addition to the signal authentication procedure of step 68. This second signal verification procedure is designed to identify a characteristic programming or interrogation signal that is distinct from the boundary-defining signal of the transmitter. The transmitter may be equipped with an additional device for generating such an interrogation signal upon demand. Upon receipt and identification of the interrogation signal, the receiver unit may be further programmed to retrieve logged data, such as the number of motivational stimuli which have been applied to the animal, to arrange this data in serial form, and then to operate the audible signal transducer via the TONE and HVENABLE lines to transmit the data in an encoded format such as frequency shift keying. The operator of the system is provided with a data retrieval device which includes a microphone for converting the encoded audible signal into an electronic signal and a decoding circuit for decoding the encoded serial data so that the data is presented to the operator in an intelligible format, such as via an alphanumeric display.

In an alternative embodiment of a data retrieval system, data may be retrieved by removing the battery from the unit and by inserting a data retrieval probe into the battery compartment. The transmitter may then be operated to generate the interrogation signal and the microcontroller may be programmed, upon recognition of the interrogation signal, to transmit serial data to the data retrieval probe via the VBATT signal connection to I/O pin D of the microcontroller U1. The microcontroller may further be programmed to download serial data via the VBATT signal line in response to detection of a predetermined programming signal from the transmitter.

In an alternative embodiment of a system for downloading data to the controller, the controller may be programmed to recognize a predetermined number of transitions on the VBATT line within a predetermined interval of time to signify that a data retrieval probe has been inserted into the battery compartment. The controller may then respond by communicating with the data retrieval probe to upload and/or download data as desired.

In other alternative embodiments, data may alternatively be downloaded to the receiver via the radio signal from the transmitter. The controller may be programmed to download encoded serial data via the detection latch L subsequent to receipt of a characteristic interrogation signal from the transmitter.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A device for controlling the movement of an animal relative to a transmitting antenna emitting a signal having a predetermined modulation characteristic, the device comprising:
   (a) a receiving antenna for receiving the transmitted signal;
   (b) a non-linear amplifier for amplifying the signal received by the receiving antenna to produce an amplified signal, said non-linear amplifier including a comparator for comparing the received signal with a selected threshold level to output the amplified signal;
   (c) authentication means for authenticating the presence of said modulation characteristic within said amplified signal, including selecting means for selecting said selected threshold; and
   (d) transducer means responsive to said authentication means for applying a selected stimulus to the animal when the presence of the modulation characteristic is authenticated by the authentication means.

2. A device for controlling the movement of an animal relative to a transmitting antenna emitting a characteristic signal, comprising:
   (a) a first receiving antenna for receiving the characteristic signal having a first terminal and a second terminal;
   (b) a second receiving antenna for receiving the characteristic signal having a first terminal and a second terminal;
   (c) a common connection terminal interconnecting the second terminal of the first antenna to the second terminal of the second antenna;
   (d) activating means connected with the first terminal of the first receiving antenna and the first terminal of the second receiving antenna for selectively activating said first and second receiving antennae;
   (e) detection means for detecting the presence of said characteristic signal at said common connection terminal; and
   (f) transducer means responsive to said detection means for applying a selected stimulus to the animal when the characteristic signal is detected at the common connection terminal by the detection means.

3. The device of claim 2 wherein said transducer means includes:
   (a) a transformer having a secondary coil for connection with said animal for delivering an electrical stimulus to the animal; and
   (b) at least a first threshold voltage conduction device connected in series between said secondary coil and said animal for preventing application of said electrical stimulus below a first threshold voltage.

4. The device of claim 3 wherein said transducer means includes a second threshold voltage conduction device connected in parallel with said secondary coil for preventing application of said electrical stimulus above a second threshold voltage.

5. The device of claim 2 comprising:
   (a) a first power supply for providing a first voltage to said detection means; and
   (b) a second power supply for providing a second voltage to said transducer means; and
   wherein said detection means includes enabling means for enabling said second power supply to produce said second voltage when the presence of said characteristic signal is detected.

6. The device of claim 5 wherein said transducer means comprises:
   (a) a transformer having a primary coil and a secondary coil, said secondary coil for connection with the animal to provide an electrical stimulus to the animal;
   (b) a capacitor connected in parallel with said primary coil and connected with said second power supply so that said capacitor is charged by said second power supply when said second power supply is enabled by said enabling means of said detection means;
   (c) a switching device connected with said primary coil for switching said primary coil; and
   (d) timing means connected with said switching device, said timing means responsive to said detection means for activating said switching device for a predetermined time period during which said capacitor discharges via said primary coil and for deactivating said switching device at the end of said predetermined time period so that the electrical stimulus is produced by said secondary coil.

7. The device of claim 2 comprising:
   (a) a battery;
   (b) a voltage regulator connected with said battery for providing electrical energy; and
   (c) a capacitor connected with said voltage regulator for storing a portion of said energy from said regulator; and
   wherein said detection means comprises regulator control means for de-activating said voltage regulator while said characteristic signal is being detected, said capacitor storing sufficient energy to operate said detection means while said characteristic signal is being detected.

8. An animal control device responsive to a transmitted signal comprising:
   (a) at least a first antenna for receiving the transmitted signal;
   (b) a transducer for applying a selected stimulus to the animal; and
   (c) control means for controlling operation of the transducer including:
      (i) timing means for measuring a temporal characteristic of the signal received by the receiving antenna;
      (ii) determining means for determining whether said temporal characteristic corresponds to a predetermined characteristic; and
      (iii) operating means for operating said transducer responsively to said determining means.

9. The animal control device in accordance with claim 8 wherein the first antenna has an output terminal and wherein the device includes:
   (a) at least a second antenna for receiving the transmitted signal, the second antenna having an output terminal; and
   (b) a common connection terminal interconnecting the output terminals of the first and second antennae; and
   wherein the control means includes antenna selection means for selectively activating each of the first and second antennae to produce an output signal from a selected one of the first and second antennae at the common connection terminal and wherein the timing means measures the temporal characteristic of the output signal.

10. The device in accordance with claim 8 wherein the determining means includes first verification means for verifying whether a first temporal characteristic corresponds to a first predetermined verifying parameter and second verification means for verifying whether a second temporal characteristic corresponds to a second predetermined verifying parameter.

11. The device in accordance with claim 10 wherein the first temporal characteristic includes duration of an active portion of a signal and the second temporal characteristic includes duration of a non-active portion of the signal.

12. The device of claim 8 comprising a second antenna generally orthogonal to said first antenna for receiving the transmitted signal and wherein said control means comprises activating means for selectively activating one of said first and second antennae.

13. The device of claim 12 wherein said first and second antennae each include a first terminal and a second terminal and wherein the first terminal of the first and second antennae are interconnected at a common terminal and wherein said activating means comprises grounding means for separately grounding the second terminals of said first and second antennae to selectively activate the respective first and second antennae.

14. The device of claim 8 wherein said timing means comprises:
   (a) a detection register for detecting the presence of the transmitted signal and for providing an indication of the detection of said transmitted signal; and
   (b) a source of a timing signal for providing a timing interval associated with said temporal characteristic; and
   wherein said determining means comprises indication-determining means for determining during said timing interval the presence of the indication at said detection register.

15. The device of claim 14 wherein said detection register includes counting means for counting selected signal oscillations and wherein said indication at the detection register includes a count of the selected oscillations of said transmitted signal during said timing interval.

16. The device of claim 14 wherein said determining means comprises reset means for repeatedly resetting the indication at the detection register during said timing interval to determine whether the temporal characteristic corresponds to the predetermined characteristic.

17. The device of claim 8 comprising first power supply means for operating said control means at a first voltage and second power supply means for providing power to said transducer at a second voltage to activate said transducer, and wherein said operating means is connected with said second power supply means for enabling operation of said second power supply means to activate said transducer.

18. The device of claim 17 wherein said transducer comprises:
   (a) a transformer having a primary coil and a secondary coil, said secondary coil for connection with the animal to provide an electrical stimulus to the animal;
   (b) a capacitor connected in parallel with said primary coil and connected with said second power supply means so that said capacitor is charged by said second power supply means when said second power supply means is enabled by said operating means;
   (c) a switching device connected with said primary coil for switching said primary coil; and
   (d) timing means connected with said switching device, said timing means responsive to said operating means for activating said switching device for a predetermined time period during which said capacitor discharges via said primary coil and for deactivating said switching device at the end of said predetermined time period so that said electrical stimulus is produced by said secondary coil.

19. The device of claim 8 wherein said control means comprises:
   (a) counting means for counting the number of applications of the stimulus; and
   (b) limiting means for preventing application of the stimulus to the animal when the number of applications of the stimulus exceeds a predetermined limit value.

20. The device of claim 19 wherein said transducer includes an audible signal transducer and wherein said control means includes output means for providing an output to said audible signal transducer to produce an audible signal representative of said number of applications of the stimulus.

21. The device of claim 8 comprising:
(a) a battery;
(b) a voltage regulator connected with said battery for providing electrical energy; and
(c) a capacitor connected with said voltage regulator for storing a portion of said energy from said regulator; and
wherein said control means comprises antenna activation means for activating said antenna and power control means for de-activating said voltage regulator while said antenna is activated and wherein said capacitor stores sufficient energy to operate said control means at least during said measurement of the temporal characteristic by said timing means.

22. The animal control device in accordance with claim 8 comprising:
(a) a filter for filtering the signal received by the first antenna to produce a filtered signal; and
(b) an amplifier for amplifying the filtered signal to produce an amplified signal; and wherein the timing means measures the temporal characteristic of the amplified signal.

23. The animal control device in accordance with claim 22 wherein the control means includes sampling means for sampling the amplified signal and wherein said timing means measures the temporal characteristic of the sampled amplified signal.

24. The device of claim 22 wherein said timing means comprises:
(a) detecting means for detecting the amplified signal and for providing an indication that the amplified signal has been detected; and
(b) reset means for resetting the indication at the detecting means; and
wherein said determining means comprises indication-determining means for determining the presence of said indication at the detecting means at a predetermined time after said indication has been reset.

25. A device for controlling the movement of an animal relative to a transmitting antenna emitting a transmission signal having a selected characteristic, comprising:
(a) a first receiving antenna for receiving the transmission signal;
(b) a second receiving antenna for receiving the transmission signal;
(c) activating means connected with the first and second receiving antennae for selectively activating one of said first and second receiving antennae to produce an output signal from the activated antenna;
(d) an amplifier for amplifying the output signal from the activated antenna to produce an amplified signal;
(e) detection means for detecting the presence of the selected characteristic in the amplified signal; and
(f) a transducer responsive to said detection means for applying a selected stimulus to the animal when the characteristic is detected by the detection means.

26. An animal control device responsive to a transmitted signal comprising:
(a) a plurality of antennae for receiving the transmitted signal, the antennae having a common output terminal;
(b) antenna activation means for activating each of the antennae in a selected sequence to produce an output signal from said each activated antenna at the output terminal;
(c) a resonant filter responsive to the output signal for attenuating frequencies outside a predetermined range to produce a filtered signal;
(d) an amplifier for amplifying the filtered signal to produce an amplified signal;
(e) a comparator for comparing an amplitude of the amplified signal with a selected threshold and for producing a comparator output signal when the amplified signal corresponds to the selected threshold;
(f) threshold adjustment means for selectively adjusting the selected threshold of the comparator;
(g) authentication means for authenticating the presence of a modulation characteristic within the comparator output signal;
(h) power supply means for supplying electrical power, the power supply means including a voltage generator responsive to activation by the authentication means for selectively supplying a generated voltage; and
(i) transducer means responsive to the voltage generator and the authentication means for applying a selected stimulus to the animal when the selected modulation characteristic is authenticated by the authentication means after the authentication means activates the voltage generator.

27. A device for controlling the movement of an animal relative to a transmitting antenna emitting a signal having a predetermined modulation characteristic, the device comprising:
(a) a receiving antenna for receiving the transmitted signal;
(b) an amplifier for amplifying the signal received by the receiving antenna to produce an amplified signal;
(c) authentication means for authenticating the presence of said modulation characteristic within said amplified signal wherein said modulation characteristic authenticated by said authentication means includes alternating intervals of activity and nonactivity and wherein said authentication means authenticates the presence of selected intervals of the activity and non-activity; and
(d) transducer means responsive to said authentication means for applying a selected stimulus to the animal when the presence of the modulation characteristic is authenticated by the authentication means.

28. The device of claim 27 wherein said authentication means includes detection means responsive to said active interval of said amplified signal for providing an indication that said active interval has been detected.

29. A device for controlling the movement of an animal relative to a transmitting antenna emitting a signal having a predetermined modulation characteristic, the device comprising:
(a) a receiving antenna for receiving the transmitted signal;

(b) an amplifier for amplifying the signal received by the receiving antenna to produce an amplified signal;

(c) authentication means for authenticating the presence of said modulation characteristic within said amplified signal; and (d) transducer means responsive to said authentication means for applying a selected stimulus to the animal when the presence of the modulation characteristic is authenticated by the authentication means, wherein said transducer means includes (i) a transformer having a secondary coil for connection with said animal for delivering an electrical stimulus to the animal; and (ii) at least a first threshold voltage conduction device connected in series between said secondary coil and said animal for preventing application of said electrical stimulus below a first threshold voltage.

30. The device of claim 29 wherein said transducer means includes a second threshold voltage conduction device connected in parallel with said secondary coil for preventing application of said electrical stimulus above a second threshold voltage.

31. A device for controlling the movement of an animal relative to a transmitting antenna emitting a signal having a predetermined modulation characteristic, the device comprising:

(a) a receiving antenna for receiving the transmitted signal;

(b) an amplifier for amplifying the signal received by the receiving antenna to produce an amplified signal;

(c) authentication means for authenticating the presence of said modulation characteristic within said amplified signal; and (d) transducer means responsive to said authentication means for applying a selected stimulus to the animal when the presence of the modulation characteristic is authenticated by the authentication means; and wherein said authentication means includes:

(i) counting means for counting the number of applications of the stimulus; and (ii) limiting means for preventing application of the stimulus to the animal when the number of applications of the stimulus exceeds a predetermined limit value.

32. A device for controlling the movement of an animal relative to a transmitting antenna emitting a signal having a predetermined modulation characteristic, the device comprising:

(a) a receiving antenna for receiving the transmitted signal;

(b) an amplifier for amplifying the signal received by the receiving antenna to produce an amplified signal;

(c) authentication means for authenticating the presence of said modulation characteristic within said amplified signal, said authentication means including (i) counting means for counting the number of applications of the stimulus; (ii) limiting means for preventing application of the stimulus to the animal when the number of applications of the stimulus exceeds a predetermined limit value; and (iii) output means; and (d) transducer means responsive to said authentication means for applying a selected stimulus to the animal when the presence of the modulation characteristic is authenticated by the authentication means, the output means of the authentication means actuating said transducer means to produce an audible signal representative of said number of applications of said stimulus.

33. A device for controlling the movement of an animal relative to a transmitting antenna emitting, a signal having a predetermined modulation characteristic, the device comprising:

(a) a receiving antenna for receiving the transmitted signal;

(b) an amplifier for amplifying the signal received by the receiving antenna to produce an amplified signal;

(c) authentication means for authenticating the presence of said modulation characteristic within said amplified signal;

(d) transducer means responsive to said authentication means for applying a selected stimulus to the animal when the presence of the modulation characteristic is authenticated by the authentication means;

(e) a first power supply for providing a first voltage to said authentication means; and (f) a second power supply for providing a second voltage to said transducer means to activate the transducer means; and wherein said authentication means includes enabling means for enabling said second power supply to produce said second voltage when the presence of said modulation characteristic is authenticated.

34. The device of claim 33 wherein said transducer means comprises:

(a) a transformer having a primary coil and a secondary coil, said secondary coil for connection with the animal to provide an electrical stimulus to the animal;

(b) a capacitor connected in parallel with said primary coil and connected with said second power supply so that said capacitor is charged by said second power supply when said second power supply is enabled by said authentication means;

(c) a switching device connected with said primary coil for switching said primary coil; and (d) timing means connected with said switching device, said timing means responsive to said authentication means for activating said switching device for a predetermined time period during which said capacitor discharges via said primary coil and for deactivating said switching device at the end of said predetermined time period so that the electrical stimulus is produced by said secondary coil.

35. The device of claim 34 wherein said capacitor has a selected capacitance so that said capacitor substantially develops a maximum current within said primary coil during said predetermined time period.

36. A device for controlling the movement of an animal relative to a transmitting antenna emitting a signal having a predetermined modulation characteristic, the device comprising:

(a) a receiving antenna for receiving the transmitted signal;

(b) an amplifier for amplifying the signal received by the receiving antenna to produce an amplified signal;

(c) authentication means for authenticating the presence of said modulation characteristic within said amplified signal;

(d) transducer means responsive to said authentication means for applying a selected stimulus to the animal when the presence of the modulation characteristic is authenticated by the authentication means;

(e) a battery;

a voltage regulator connected with said battery for providing electrical energy to the device; and (g) a capacitor connected with said voltage regulator for storing a portion of said energy from said regulator; and wherein said authentication means comprises regulator control means for de-activating said voltage regulator while said modulation characteristic is being authenticated, said capacitor storing sufficient energy to operate said authentication means while said modulation characteristic is being authenticated.

* * * * *